UNITED STATES PATENT OFFICE.

JOHN T. COOKE, OF BROOKLYN, NEW YORK.

IMPROVEMENT IN COMPOUNDS FOR COATING ROASTED COFFEE.

Specification forming part of Letters Patent No. 205,356, dated June 25, 1878; application filed April 25, 1878.

*To all whom it may concern:*

Be it known that I, JOHN T. COOKE, of Brooklyn, in the county of Kings and State of New York, have invented a new and useful Improvement in the Manufacture of Roasted Coffee, which improvement is fully set forth in the following specification.

This invention relates to certain improvements in coating roasted coffee to prevent shrinkage, to prevent the escape of the aroma, and to protect the coffee against the moisture of the atmosphere, while at the same time the materials and the process are cheap, and the increase in the weight of the coffee more than compensates for the cost.

My invention consists in a compound of glucose and gum-tragacanth for coating the coffee-beans. In order to mix these two ingredients, I take about one-fourth ($\frac{1}{4}$) of a pound of glucose and dissolve it in about two (2) gallons of water, and to this solution I add about three-fourths ($\frac{3}{4}$) of a pound of gum-tragacanth, stirring the whole until a homogeneous solution is produced. The compound thus produced I apply to the coffee-beans during the operation of roasting, or immediately after the coffee has been roasted and before it has cooled.

Roasted coffee prepared according to my invention can be carried on board of sailing-vessels or steamers on long voyages without getting damp or losing any portion of its aroma.

I am aware that many experiments have been made to coat roasted coffee. For instance, sugar has been used and recommended for this purpose for more than twenty years past. Eggs have also been used for this purpose for more than thirty-five years past to my knowledge. The disadvantage of sugar, however, is that this substance is hydroscopic—that is to say, it attracts moisture from the atmosphere—and the coffee coated with sugar is liable to become damp. The albuminous matter contained in the eggs produces a good protective coat for the coffee; but eggs are generally too expensive to be used with economy for coating coffee.

I do not claim as my invention a compound for coating roasted coffee containing glutinous or gelatinous matter, such having been used before. Neither do I claim in this present application the use of starch, either alone or mixed with gum-arabic or with such gum and with the essence of coffee, such being described in my Patent No. 131,852, Reissue No. 5,383, dated April 29, 1873. Nor do I claim, broadly, the combination of starch, gum, and another gum or other gums as a material for coating the roasted coffee-berry.

What I claim as new, and desire to secure by Letters Patent, is—

A compound of glucose and gum-tragacanth, when mixed together about in the proportions herein specified, for the purposes set forth.

In testimony that I claim the foregoing I have hereunto set my hand and seal this 22d day of April, 1878.

JOHN T. COOKE. [L. S.]

Witnesses:
W. HAUFF,
E. F. KASTENHUBER.